United States Patent [19]

Sutter, Jr. et al.

[11] Patent Number: 4,477,087
[45] Date of Patent: Oct. 16, 1984

[54] SEAL FORMED OUT OF A HARD METAL WITH A PLATING OF SOFT METALS

[76] Inventors: Leroy V. Sutter, Jr., 6301 Summertime La., Culver City, Calif. 90230; Harold A. Cameron, 635 W. Baker St., M-103, Costa Mesa, Calif. 92626

[21] Appl. No.: 516,123

[22] Filed: Jul. 20, 1983

[51] Int. Cl.³ ............................................... F16J 15/08
[52] U.S. Cl. ......................................... 277/26; 277/12; 277/206 R; 277/235 A; 277/236; 372/64
[58] Field of Search ............... 277/12, 32, 205, 206 R, 277/212 R, 212 C, 234, 235 R, 235 A, 236; DIG. 6, 22, 26; 372/64

[56] References Cited

U.S. PATENT DOCUMENTS

| | | | |
|---|---|---|---|
| 2,641,381 | 6/1953 | Bertrand | 277/236 X |
| 2,937,039 | 5/1960 | Santapa | 277/26 |
| 3,083,023 | 3/1963 | Creavey | 277/206 R |
| 3,167,320 | 1/1965 | Kyle | 277/236 X |
| 3,207,524 | 9/1965 | Trbovich | 277/206 X |
| 3,225,956 | 12/1965 | Laming | 220/240 |
| 3,272,521 | 9/1966 | McNenny | 277/26 X |
| 4,169,251 | 9/1979 | Laskmann | 372/64 |
| 4,261,584 | 4/1981 | Browne et al. | 277/206 R |
| 4,281,841 | 8/1981 | Kim et al. | 277/236 |
| 4,353,560 | 10/1982 | Tohill | 277/236 |
| 4,372,565 | 2/1983 | Lien | 277/236 |

FOREIGN PATENT DOCUMENTS

| | | | |
|---|---|---|---|
| 462424 | 11/1913 | France | 277/206 |
| 610973 | 6/1926 | France | 277/26 |
| 44-30609 | 9/1969 | Japan | 277/26 |
| 264524 | 2/1928 | United Kingdom | 277/206 |
| 475967 | 11/1937 | United Kingdom | 277/235 |
| 998393 | 7/1965 | United Kingdom | 277/DIG. 6 |

OTHER PUBLICATIONS

"Metal V-Seals-Mark II," Parker Seal Company, booklet issued Mar. 1969, front cover and pp. 4 and 5.

*Primary Examiner*—Robert S. Ward
*Attorney, Agent, or Firm*—W. Edward Johansen

[57] ABSTRACT

A sealing system including an elongated cylindrical member which has a first open end and a flat circular peripheral edge adjacent to the first open end and a circular member having has a flat surface which is disposed adjacent, but not contiguous, to the flat circular peripheral edge of the elongated cylindrical member. The sealing system also includes a coupling mechanism which mechanically couples the flat surface of the circular member to the first open end of the elongated cylindrical member. The improved seal is inserted between the flat surface of the circular member and the flat circular peripheral edge of the elongated cylindrical member to which the coupling mechanism applies a compressive force. The improved seal includes an annular member which has an outer surface and which is formed from a hard metallic material, which is relatively non-deformable by the compressive force, and which has a substantially circular cross-section. The annular member has a slot adjacent to its outer peripheral edge. The improved seal also has a plating of a soft metallic material which is mechanically coupled to the outer surface of the annular member. The plating of the soft metallic material is deformable by the compressive force so that the plating of the soft metallic material forms a seal between the flat surface of the circular member and the flat circular peripheral edge of the elongated cylindrical member.

3 Claims, 7 Drawing Figures

SEAL FORMED OUT OF A HARD METAL WITH A PLATING OF SOFT METALS

BACKGROUND OF THE INVENTION

1. Field of the Invention

The present invention relates to a sealing system for use with a gas laser, which has a laser mirror and a laser tube, wherein the sealing system sealingly couples the laser mirror to the laser tube and more particularly to a hermetic sealing ring formed from a hard metal which is relatively non-deformable by a small compressive force and plated with a thin layer of soft metal which is deformable by the small compressive force in order to provide a hermetic seal without damaging the laser mirror.

2. Description of the Prior Art

U.S. Pat. No. 4,169,251, teaches Waveguide Gas Laser with High Frequency Transverse Discharge Excitation, issued to Katherine D. Laakman on Sept. 25, 1979, teaches waveguide lasers which are excited by means of a transverse discharge at radio frequencies generally in the vhf-uhf range, i.e., from about 30 MHz to about 3 GHz. These excitation frequencies are sufficiently high to ensure negligible interaction of discharge electrons with the discharge-establishing electrodes, thereby achieving superior discharge properties which result in a laser of improved performance and reduced size and complexity.

U.S. Pat. No. 4,372,565, entitled Soft Metal Seal, issued to Neil C. Lien on Feb. 8, 1983, teaches an improved high pressure sealing system which provides a deformable sealing member between a pair of vacuum system elements. The improved high pressure sealing system includes a channel for allowing fluid to be vented from the space between one of vacuum system elements and a deformable sealing member of the improved high pressure seal on the low pressure side of one of the vacuum system elements in order to prevent the trapping of gasses inside of the improved high pressure seal which can contribute to outgassing at a later time. The venting channel is formed either in the deformable sealing member itself, or in one of the two vacuum system elements in its face adjoining the sealing member.

U.S. Pat. No. 4,353,560, entitled Metal Seal Assembly with Deformable Sealing Ring, issued to Henry O. Tohill on Oct. 12, 1982, teaches a metallic sealing ring assembly which seals an annulus between metallic surface of concentric tubular members. The metallic sealing ring assembly includes a central metallic sealing ring which has flared upper and lower annular flanges at both its inner and outer peripheries. The metallic sealing ring is sandwiched between upper and lower adapter rings which are disposed concentrically therewith and formed with the bevelled annular edges which contact the flared surfaces of the metallic sealing ring flanges at a mating angle of five degrees. The annular flanges, when axially compressed, are deflected radially and they are deformed at their tips and extruded against the surfaces of the members defining the annulus in order to establish metal to a metal seal therewith. The flanges are truncated at their free ends whereby initial engagement of the adapter rings with the metallic sealing ring and annulus defining members is along the annular edges of the flange tips and the compression force is concentrated thereat. Axial loading is applied by holddown screws with tips in camming engagement with a camming surface on the upper adapter ring.

U.S. Pat. No. 4,281,841, entitled O-ring Sealing Arrangement for Ultra-high Vacuum System, issued to Chang-Kye Kim and Rober Flaherty on Aug. 4, 1981, teaches an all metal seal reusable O-ring sealing arrangement which seals two concentric tubes in an ultra-high vacuum system and all metal seal reusable O-ring sealing arrangement includes an O-ring which is formed from a heat recoverable alloy such as Nitinol and which is concentrically posititioned between protruding sealing rings of the concentric tubes. The O-ring is installed between the concentric tubes while it is in a stressed martensitic state and it is made to undergo a thermally induced transformation from the stressed martensite state to an austenitic state. During the transformation the O-ring expands outwardly and radially inwardly toward a previously sized austenitic configuration thereby sealing against the protruding sealing rings of the concentric tubes.

SUMMARY OF THE INVENTION

In view of the foregoing factors and conditions which are characteristic of the prior art it is the primary object of the present invention to provide a sealing system for use with a gas laser, which has a laser mirror and a laser tube, which sealingly couples the laser mirror to the laser tube.

It is another object of the present invention to provide a sealing system which includes a hermetic sealing ring formed from a hard metal which is relatively non-deformable by a small compressive force and plated with a thin layer of soft metal which is deformable by the small compressive force in order to provide a hermetic seal without damaging the laser mirror.

In accordance with the preferred embodiment of the present invention an improved seal for use in a sealing system is described. The sealing system includes an elongated cylindrical member which has a first open end and a flat circular peripheral edge adjacent to the first open end and a circular member having has a flat surface which is disposed adjacent, but not contiguous, to the flat circular peripheral edge of the elongated cylindrical member. The sealing system also includes a coupling mechanism which mechanically couples the flat surface of the circular member to the first open end of the elongated cylindrical member. The improved seal is inserted between the flat surface of the circular member and the flat circular peripheral edge of the elongated cylindrical member to which the coupling mechanism applies a compressive force. The improved seal includes an annular member which has an outer surface and which is formed from a hard metallic material, which is relatively non-deformable by the compressive force, and which has a substantially circular cross-section. The annular member has a slot adjacent to its outer peripheral edge. The improved seal also has a plating of a soft metallic material which is mechanically coupled to the outer surface of the annular member. The plating of the soft metallic material is deformable by the compressive force so that the plating of the soft metallic material forms a seal between the flat surface of the circular member and the flat circular peripheral edge of the elongated cylindrical member.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
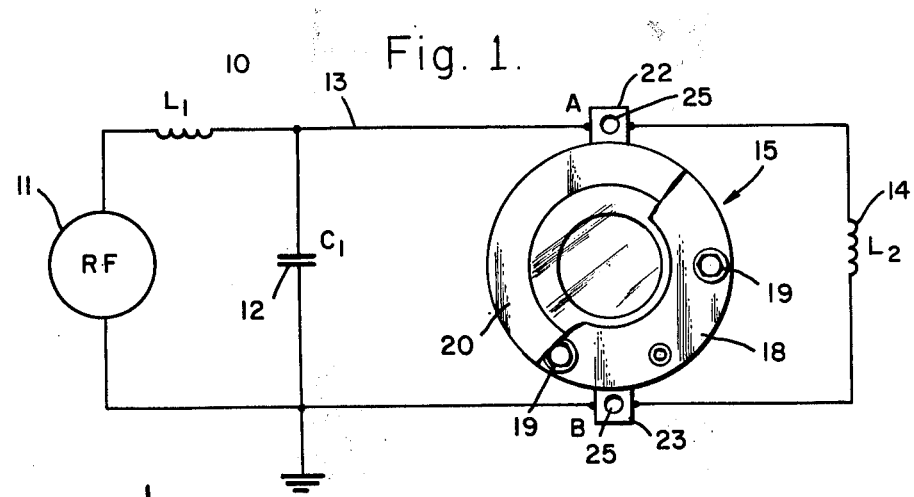
FIG. 1 is a schematic drawing of a transversely excited gas laser including an improved coupling circuit including first and second impedance-matching circuits in combination with a laser bore and electrode structure which has a elongated cylindrical chamber and which includes an improved seal which has been constructed in accordance with the principles of the preferred embodiment of the present invention.

In order to best understand the present invention it is necessary to refer to the following description of its preferred embodiment in conjunction with the accompanying drawing. Referring to FIG. 1, a transversely excited gas laser 10 includes an rf generator 11, an improved coupling circuit 12 and a coaxial connector 13 which electrically couples the rf generator 11 to the improved coupling circuit 12. The improved coupling circuit 12 includes a first impedance-matching circuit 14, which is electrically coupled to feed points A and B of a laser bore and electrode structure 15. The transversely excited gas laser 10 further includes a pair of optical reflectors 17, which form a laser resonator. A pair of improved seals 16 are sealingly coupled to a pair of reflector mounts 18 and are secured thereto by a set of screws 19.

Figure 2:
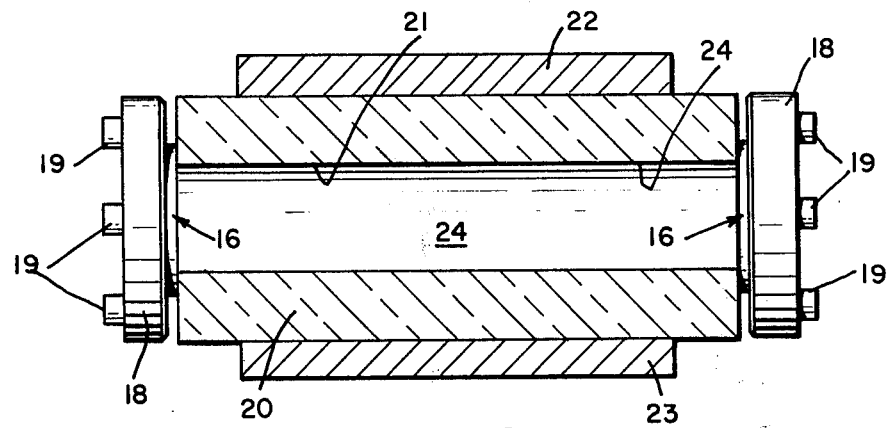
FIG. 2 is a longitudinal cross-sectional view of the laser bore and electrode structure of FIG. 1.

Referring to FIG. 2 in conjunction with FIG. 1 the laser bore and electrode 15 includes an elongated cylindrical chamber 20 which is of cross-sectional dimensions, not only in the range of 0.25 mm$^2$ to 7.5 mm$^2$, but also in the range greater than 7.5 mm$^2$, which is suitable for confining a laser gas discharge. The elongated cylindrical chamber 20 includes an internal sidewall 21 and is formed from a dielectric material, such as BeO, Al$_2$O$_3$ or glass. The pair of sealing rings 16 are also sealingly coupled to the ends of the elongated cylindrical chamber and are secured thereto by the set of screws 19.

Figure 3:
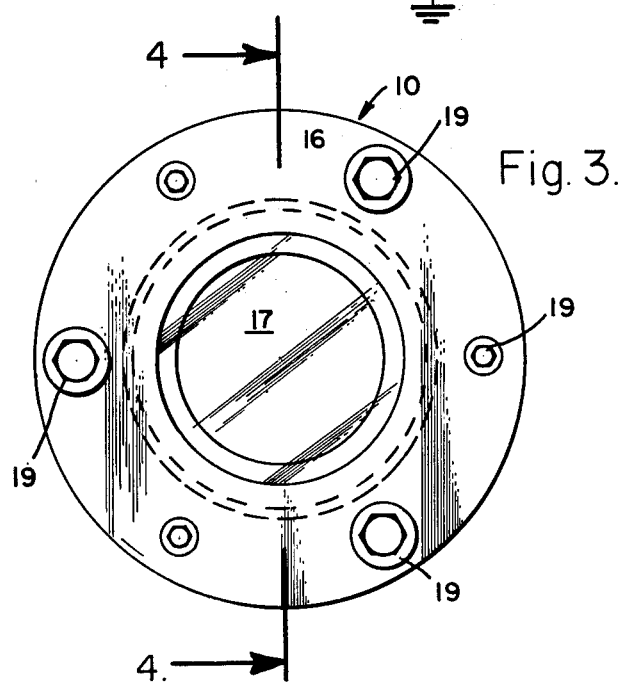
FIG. 3 is an elevational end view of the laser bore and electrode structure of FIG. 1.
Figure 4:
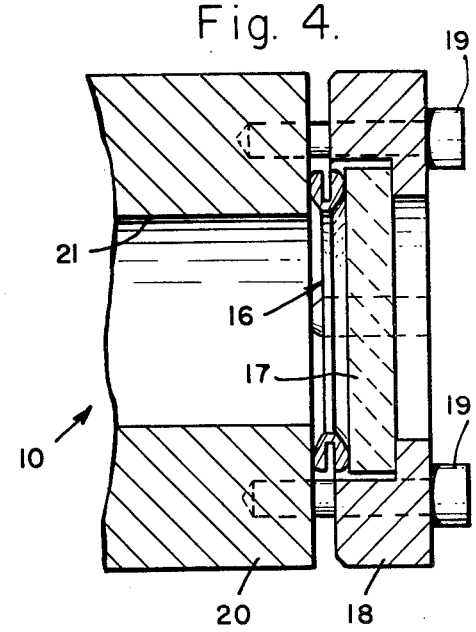
FIG. 4 is an enlarged, fragmentary longitudinal cross-sectional view of the laser bore and electrode structure of FIG. 1 showing the improved seal.

Referring to FIG. 2 in conjunction with FIG. 1, FIG. 3 and FIG. 4 the laser bore and electrode structure 15 also includes first electrode plate 22 and a second electrode plates 23. The first and second electrode plates 22 and 23 are used for transversely exciting a laser gas 24, which may be a standard CO$_2$ laser gas mixture including 65% He, 22% N$_2$, 13% CO$_2$ by mole fraction. The first and second parallel electrode plates 22 and 23 are formed from an electrically conductive material, such as aluminum or copper, and are disposed parallel and opposing each other. Each of the first and second electrode plates 22 and 23 has a cooling bore 25 through which a coolant can flow. The rf generator 11 provides an alternating electric field in the elongated cylindrical chamber 20 along a direction transverse to the length of the elongated cylindrical chamber 20 and at a frequency ranging from 10 MHz to about 3 GHz to establish the laser gas discharge in the laser gas 24.

A sufficient amount of the laser gas 24 must be maintained in the elongated cylindrical chamber 20 in order to support the laser gas discharge. The laser gas 24 is at pressure ranging from 1 Torr to about 1000 Torr. The laser gas 24 is sealed in the elongated chamber 20. In the preferred embodiment the pair of optical reflectors 17 are optically aligned with and mechanically coupled to the elongated cylindrical chamber 20 in to seal the laser gas in the elongated cylindrical chamber 20.

The optical reflectors 17 reflect light energy from the laser gas discharge within the elongated cylindrical chamber 20 so that the light energy travels longitudinally the length of the elongated cylindrical chamber 20. In the preferred embodiment the optical reflectors 17 not only reflect, but also guide the light energy within the elongated cylindrical chamber 20 so that the light energy is optically independent of the internal sidewall 21 of the elongated cylindrical chamber 20.

In another embodiment the transversely excited gas laser 10 may also include a gas inlet and a gas outlet for letting the laser gas 24 into and out of the elongated cylindrical chamber 20 and a gas regulating device for regulating the pressure of the laser gas 24 in the elongated cylindrical chamber 20.

In still other embodiments the transversely excited gas laser 10 may include an enclosure in which the elongated cylindrical chamber 20 is disposed and the laser gas 24 is sealed. The transversely excited gas laser 10 may also include a gas inlet and a gas outlet for letting the laser gas 24 into and out of the enclosure and a gas regulating device for regulating the pressure of the laser gas 24 in the enclosure.

Figure 5:
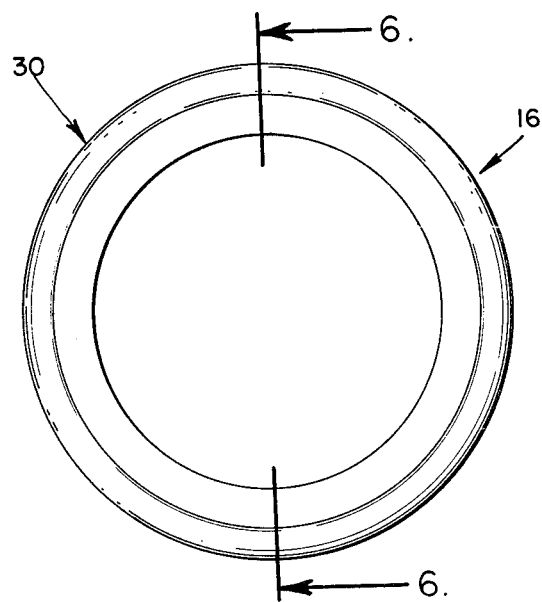
FIG. 5 is a top plan view of the improved seal of FIG. 1.

Referring to FIG. 5 the sealing system includes the elongated cylindrical chamber 20 which has a first open end and a flat circular peripheral edge adjacent to the first open end and a pair of reflector mounts 18 each of which is a circular member having flat surface which is disposed adjacent, but not contiguous, to the flat circular peripheral edge of the elongated cylindrical chamber 20. The pair of improved seals 16 are sealingly coupled to the pair of reflector mounts 18 and are secured thereto by the set of screws 19 which form the coupling mechanism which mechanically couples the flat surface of the circular member to the first open end of the elongated cylindrical chamber 20. The improved seal 16 is inserted between the flat surface of the circular member and the flat circular peripheral edge of the elongated cylindrical chamber 20 to which the coupling mechanism applies a compressive force.

Figure 6:
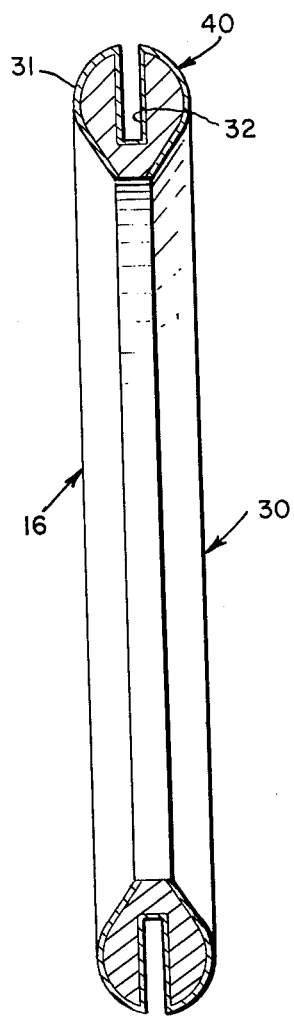
FIG. 6 is a transverse cross-sectional view of the improved seal of FIG. 1 taken along the line 6—6 of FIG. 5.

Referring to FIG. 6 in conjunction with FIG. 5 the improved seal 16 which is flexible has several advantages over current sealing technique. Firstly, the current technique of sealing the pair of optical reflectors 17 which form the resonator optics to the elongated cylindrical chamber 20 which forms a laser bore of an infrared transversely excited gas laser 10 is typically done by means of a cold compression seal using malleable indium or indium alloys as the sealing materal. Unfortunately, indium and indium alloys have very high thermal expansion coefficients which are much higher than the thermal expansion coefficients of the ceramic materials which form the elongated cylindrical chamber 21 and also higher than the thermal expansion coefficients of the semiconductor materials, such as zinc selinide (ZnSe) and germanium (Ge), which form each of the optical reflectors 17 of the resonator optics.

Still referring to FIG. 6 in conjunction with FIG. 5 when the infrared transversely excited gas laser 10 is operated under temperature cycling the indium seal tends to fail as shear forces in it tends to cause failure of the indium seal at its bond surfaces. In order to eliminate this problem, the inventor has used in forming the improved seal 16 a base material, such as titanium or its alloys, which provides a degree of flexibility and which has a thermal expansion coefficient which is close to that of the ceramic and semiconductor materials which form the laser bore and resonator optics. The base material can be coated with a malleable material, such as indium or its alloys.

Figure 7:
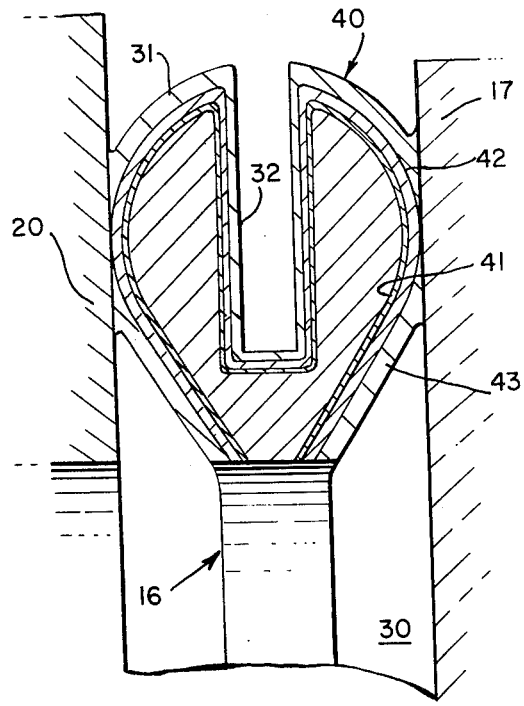
FIG. 7 is a further enlarged, fragmentary longitudinal cross-sectional view of the laser bore and electrode structure of FIG. 1 showing the improved seal.

Referring to FIG. 7 in conjunction with FIG. 4 the base 30 of the improved seal 16 is a semi-flexible, annular ring 31 which can be fabricated from titanium or its alloys. Metallic materials other than titanium or its alloys including 400 series, corrosion resistant steels also make a good base material for the annular ring 31. The annular ring 31 has a circular cut 32 which allows for the some flexibility in the alignment of the optical reflectors 17. The annular ring 31 is coated with a plating 40 of malleable metallic material 40 which provides cold sealing capability while providing a thermally matched seal which will tolerate temperature cycling of the sealing system without failure. The malleable metallic material 40 may be indium, lead, silver, gold, copper or their alloys. The annular ring 31 can also be coated with non-metallic compounds such as Teflon, plastic and other organic compounds.

Referring to FIG. 6 in conjunction with FIGS. 5 and 7 the improved seal 16 includes an annular member 31 which has an outer surface and which is formed from a hard metallic material, which is relatively non-deformable by the compressive force, and which has a substantially circular cross-section. The annular member has a slot adjacent to its outer peripheral edge. The improved seal 16 also has a plating of a soft metallic material which is mechanically coupled to the outer surface of the annular member. The plating of the soft metallic material is deformable by the compressive force so that the plating of the soft metallic material forms a seal between the flat surface of the circular member and the flat circular peripheral edge of the elongated cylindrical chamber 20.

Again referring to FIG. 7 in conjunction with FIG. 4 and in the preferred embodiment the plating 40 of malleable metallic material includes a thin plating 41 of nickel which is deposited on the outer surface of the annular ring 31, a relatively thicker plating 42 of gold and a much thicker plating 43 of indium. When the improved seal 16 is under compression force the plating 43 of indium is deformed and the plating 42 of gold comes into contact with the surfaces of optical reflector 17 and the elongated cylindrical chamber 20.

From the foregoing it can be seen that an improved seal has been described. It should be noted that the sketches are not drawn to scale and that distances of and between the figures are not to be considered significant.

Accordingly it is intended that the foregoing disclosure and showing made in the drawing shall be considered only as an illustration of the principles of the present invention.

What is claimed is:

1. An improved seal for use in sealing a gas laser system which includes:
    a. an elongated cylindrical chamber which is formed from a ceramic material and which has an axis, a first open end and a flat circular peripheral edge adjacent to said first open end;
    b. a reflector mount which is a circular member having has a flat surface which is substantially coaxially aligned with said axis and which is disposed adjacent, but not contiguous, to said flat circular peripheral edge of said elongated cylindrical chamber; and
    c. coupling means for mechanically coupling said flat surface of said reflector mount to said first open end of said elongated cylindrical chamber wherein said improved seal is inserted between said flat surface of said circular member and said flat circular peripheral edge of said elongated cylindrical chamber and said coupling means applies a compressive force, said improved seal comprising:
    a. an annular member having an outer surface and being formed from titanium which is relatively non-deformable by said compressive force, said annular member having a substantially circular cross-section, said annular member also having a slot which is disposed orthogonally to said axis and adjacent to its outer peripheral edge; and
    b. a plating of gold which is mechanically coupled to said outer surface of said annular member wherein said plating of gold is deformable by said compressive force so that said plating of gold forms a seal between said flat surface of said circular member and said flat circular peripheral edge of said elongated cylindrical member whereby the coefficient of thermal expansion of titanium forming said annular member matches the coefficient of thermal expansion of the ceramic material forming said elongated cylindrical chamber.

2. An improved seal according to claim 1 wherein said soft metallic material is indium.

3. An improved seal according to claim 1 wherein said soft metallic material is an alloy of indium.

* * * * *